(12) United States Patent
Chen et al.

(10) Patent No.: US 8,952,127 B2
(45) Date of Patent: Feb. 10, 2015

(54) PEPTOIDS USEFUL FOR CATALYZING THE MINERALIZATION OF CALCIUM CARBONATE

(75) Inventors: Chun-Long Chen, Albany, CA (US); Ronald N. Zuckermann, El Cerrito, CA (US); James J. De Yoreo, Clayton, CA (US)

(73) Assignee: The Regents of the University of California, Oakland, CA (US)

( * ) Notice: Subject to any disclaimer, the term of this patent is extended or adjusted under 35 U.S.C. 154(b) by 569 days.

(21) Appl. No.: 13/153,141

(22) Filed: Jun. 3, 2011

(65) Prior Publication Data

US 2011/0300053 A1 Dec. 8, 2011

Related U.S. Application Data

(60) Provisional application No. 61/351,807, filed on Jun. 4, 2010.

(51) Int. Cl.
*C07K 2/00* (2006.01)
*C07K 7/00* (2006.01)
*C07K 7/06* (2006.01)
*C07K 7/08* (2006.01)
*C01F 11/18* (2006.01)
*C08G 69/10* (2006.01)

(52) U.S. Cl.
CPC .............. *C01F 11/183* (2013.01); *C08G 69/10* (2013.01); *C01P 2004/03* (2013.01); *C01P 2004/30* (2013.01); *C01P 2004/32* (2013.01); *C01P 2004/39* (2013.01); *C01P 2004/61* (2013.01); *Y10S 930/03* (2013.01)

USPC ........... 530/300; 530/326; 530/327; 530/328; 530/329; 530/330; 930/20; 930/30; 423/430

(58) Field of Classification Search
CPC .............. C07K 7/00; C07K 7/06; C07K 7/08; C07K 14/00; C01F 11/181
USPC .......... 530/300, 326, 327, 328, 329; 423/430; 528/332

See application file for complete search history.

(56) References Cited

U.S. PATENT DOCUMENTS

| 7,834,144 B2 | 11/2010 | Peretz et al. |
| 8,445,632 B2 | 5/2013 | Barron et al. |
| 2007/0087972 A1 | 4/2007 | Peretz et al. |
| 2012/0027677 A1 | 2/2012 | Peretz et al. |
| 2012/0046443 A1 | 2/2012 | Zuckermann et al. |

FOREIGN PATENT DOCUMENTS

| WO | WO2009/105167 A2 | 8/2009 |
| WO | WO2010/017412 A1 | 2/2010 |

OTHER PUBLICATIONS

Elhadj et al., "Role of molecular charge and hydrophilicity in regulating the kinetics of crystal growth," Proc. Natl. Acad. Sci. USA 2006, 103:19237-19242.*

(Continued)

*Primary Examiner* — Samuel Woolwine
*Assistant Examiner* — Kaijiang Zhang
(74) *Attorney, Agent, or Firm* — Robin C. Chiang; Lawrence Berkeley National Laboratory (57) ABSTRACT

The present invention provides for a bio-mimetic polymer capable of catalyzing $CO_2$ into a carbonate.

15 Claims, 6 Drawing Sheets

(56) References Cited

OTHER PUBLICATIONS

Chen et al., "Engineered Biomimetic Polymers as Tunable Agents for Controlling CaCO3 Mineralization," J. Am. Chem. Soc. 2011, 133:5214-5217.*

Addadi et al., "Interactions between acidic proteins and crystals: stereochemical requirements in biomineralization", PNAS (Jun. 1, 1985), vol. 82, No. 12, 4110-4114.

Cusack et al., "Biomineralization: Elemental and Organic Influence in Carbonate Systems", Chem. Rev. (2008), 108, 4433-4454.

Elhadj et al., "Peptide Controls on Calcite Mineralization: Polyaspartate Chain Length Affects Growth Kinetics and Acts as a Stereochemical Switch on Morphology", Crystal Growth & Design, vol. 6, No. 1, 197-201 (2006).

Kerisit et al., "Atomistic Simulation of the Dissociative Adsorption of Water on Calcite Surfaces", J. Phys. Chem. B (2003), 107, 7676-7682.

Lardge et al., "Investigation of the Interaction of Water with the Calcite (10.4) Surface Using Ab Initio Simulation", J. Phys. Chem. C (2009), 113, 7207-7212.

Lee et al., "Folding a Nonbiological Polymer into a Compact Multihelical Structure", J. Am. Chem. Soc. (2005), 127, 10999-11009.

Lee et al., "Biomimetic Nanostructures: Creating a High-Affinity Zinc-Binding Site in a Folded Nonbiological Polymer", J. Am. Chem. Soc. (2008), 130, 8847-8855.

Lee et al., "On carbon dioxide storage based on biomineralization strategies", Micron (2010), 41, 273-282.

Meldrum, "Calcium carbonate in biomineralisation and biomimetic chemistry", International Materials Reviews (2003), vol. 48, No. 3, 187.

Miller et al., "Comparison of the Proteolytic Susceptibilities of Homologous L-Amino Acid, D-Amino Acid, and N-Substituted Glycine Peptide and Peptoid Oligomers", Drug Development Research, 35:20-32 (1995).

Nam et al., "Free-floating ultrathin two-dimensional crystals from sequence-specific peptoid polymers", Nature Materials, 9, 454-460 (2010).

Sanborn et al., "Extreme Stability of Helices Formed by Water-Soluble Poly-N-Substituted Glycines (Polypeptoids) with α-Chiral Side Chains", Biopolymers, vol. 63, 12-20 (2002).

Sommerdijk et al., "Biomimetic CaCO3 Mineralization using Designer Molecules and Interfaces", Chem. Rev. (2008), 108, 4499-4550.

Zuckermann et al., "Efficient method for the preparation of peptoids [oligo(N-substituted glycines)] by submonomer solid-phase synthesis", J. Am. Chem. Soc. (1992), 114, 10646-10647.

* cited by examiner

PEPTOIDS USEFUL FOR CATALYZING THE MINERALIZATION OF CALCIUM CARBONATE

CROSS-REFERENCE TO RELATED APPLICATIONS

This application claims priority to U.S. Provisional Patent Application Ser. No. 61/351,807, filed Jun. 4, 2010, which is hereby incorporated by reference in its entirety.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

FIELD OF THE INVENTION

This invention relates generally to peptoids.

BACKGROUND OF THE INVENTION

Numerous discoveries within the field of biomimetic research have led to the recognition that proteins can induce or accelerate precipitation of inorganic materials—both crystalline and amorphous—from aqueous precursors under ambient conditions. In vitro experiments have demonstrated that these same proteins as well as shorter chain peptides that mimic certain regions of the proteins can exhibit these same effects absent any biological context. These findings suggest that synthetic molecules might be discovered that can serve as accelerants of crystallization processes in industrial settings. Moreover, design of molecules that mimic the action of these natural biopolymers but that are much more stable against high pressures, temperatures and acidic conditions would result in a technology that is broadly applicable to industrial crystallization. Some example areas of potential application include pharmaceuticals, non-linear optical crystals, scintillators, and materials for sequestration of metals, radionuclides and $CO_2$. While the overall concept of using non-natural biomimetic polymers to accelerate crystallization or amorphous precipitation is the general subject of our disclosure, the last of these examples is the application addressed by the specific claims of this disclosure.

Since the mid-20th century, the average temperature of Earth's near surface air and oceans is significantly increased. The Intergovernmental Panel on Climate Change (IPCC) concludes that most of the observed temperature increase was very likely caused by increasing concentrations of greenhouse gases resulting from human activity such as fossil fuel burning and deforestation. The increase of carbon dioxide ($CO_2$) (one of the main greenhouse gases) in the atmosphere is believed one of main contributions which cause global warming. How to efficiently capture carbon dioxide and stabilize atmospheric $CO_2$ level has become significantly important to stop global warming.

Currently, many types of materials have been developed for targeting $CO_2$ capture. For example, alkylamine-containing liquids were developed for chemisorption of $CO_2$; porous materials (e.g. zeolites, metal-organic frameworks) were developed for physical adsorption of $CO_2$. Although some of these materials have shown promising applications for $CO_2$ sequestration, several disadvantages have to be addressed to store large amount of $CO_2$ in geological environment, such as the materials stability in geological environment, the materials toxicity to the geological environment, the storage capability only under high pressure and low temperature, and the cost to prepare large amount of materials.

SUMMARY OF THE INVENTION

The present invention provides for a bio-mimetic polymer capable of catalyzing $CO_2$ into a carbonate. In some embodiments of the invention, the bio-mimetic polymer is a peptoid or poly-N-substituted glycine. In some embodiments of the invention, the peptoid is an amphiphilic polymer.

The present invention provides for a method for sequestering carbon dioxide, comprising: (a) providing a bio-mimetic polymer capable of catalyzing $CO_2$ into a carbonate, and (b) contacting the bio-mimetic polymer with a carbon dioxide, such that the carbonate is formed.

The present invention provides for a sequence-specific bio-mimetic polymer (such as a peptoid) that is a catalyst capable of catalyzing and/or accelerating the mineralization of $CaCO_3$, and capture $CO_2$ in the form of $CaCO_3$ minerals. This $CO_2$ capture process can be performed under geological environmental conditions and the formed $CaCO_3$ minerals can be stored underground.

The present invention provides for peptoid polymers of specific sequence that accelerate the formation of calcium carbonate, and store the $CO_2$ in the form of calcium carbonate minerals. The peptoid polymers can accelerate the process by 20 to 40-fold, as compared to existing materials which can only achieve a 1.5-fold acceleration. Furthermore, the peptoid polymers are effective at very dilute concentrations (nanomolar) range. The peptoids are catalysts, and are re-usable.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a peptoid" includes a plurality of such peptoids, and so forth.

In this specification and in the claims that follow, reference will be made to a number of terms that shall be defined to have the following meanings:

The term "peptoid" refers to a peptoid polymer.

The present invention provides for a bio-mimetic polymer capable of catalyzing $CO_2$ into a carbonate. In some embodiments of the invention, the bio-mimetic polymer is a peptoid or poly-N-substituted glycine. In some embodiments of the invention, the peptoid is an amphiphilic polymer. In some embodiments of the invention, the peptoid is peptoid-1, peptoid-2, peptoid-3, peptoid-4, peptoid-6, or peptoid-10. In some embodiments of the invention, the peptoid has a molecular weight from about 1600 g/mol to about 2400 g/mol. In some embodiments of the invention, the peptoid has a molecular weight from about 1690 g/mol to about 2350 g/mol. In some embodiments of the invention, the peptoid is an oligomeric amphiphilic peptoid, such as a hexameric or octameric amphiphilic peptoid. In some embodiments of the invention, the peptoid is capable of accelerating the process of formation of carbonate from $CO_2$ equal to or more than tenfold, when compared to the formation of carbonate from $CO_2$ in the absence of the peptoid. In some embodiments of the invention, the peptoid is capable of accelerating the process of formation of carbonate from $CO_2$ equal to or more than 20-fold. In some embodiments of the invention, the peptoid is capable of accelerating the process of formation of carbonate from $CO_2$ equal to or more than 40-fold. In some embodiments of the invention, the peptoid comprises from about 3 to about 100 monomeric residues. In some embodiments of the invention, the peptoid comprises from about 3 to about 20 monomeric residues. In some embodiments of the invention, the peptoid comprises from about 6 to about 20 monomeric residues. In some embodiments of the invention, the peptoid comprises from about 6 to about 18 monomeric residues. In some embodiments of the invention, the peptoid comprises from about 12 to about 16 monomeric residues. In some embodiments of the invention, the peptoid comprises hydrophobic and hydrophilic N-substituents. In some embodiments of the invention, each monomeric residue of the peptoid comprises a hydrophobic or hydrophilic N-substituent. In some embodiments of the invention, the peptoid comprises two or more (such as four or more) hydrophobic N-substituent which are grouped together, i.e., the hydrophobic N-substituents are on consecutive monomeric residues. In some embodiments of the invention, the peptoid comprises two or more (such as four or more) hydrophobic N-substituent which are grouped together in the middle or at one end of the peptoid. In some embodiments of the invention, the peptoid comprises two or more hydrophilic N-substituent which are grouped together i.e., the hydrophilic N-substituents are on consecutive monomeric residues. In some embodiments of the invention, the peptoid comprises two or more hydrophobic N-substituents grouped together, and two or more hydrophilic N-substituents grouped together. In some embodiments of the invention, the hydrophobic N-substituent comprises an aromatic group. In some embodiments of the invention, the hydrophobic N-substituent is $-(CH_2)_2-C_6H_5$, $-(CH_2)_2-C_6H_4-X$ (wherein X is a halogen, such as F, Br, Cl, or I), or $-(CH_2)_2-C_6H_4-O-CH_3$; wherein the benzene is para-, ortho- or meta-disubstituted. In some embodiments of the invention, the hydrophilic N-substituent comprises a carboxylic acid, sulfate, sulfonate, phosphate, phosphonate group, or the like. In some embodiments of the invention, the hydrophilic N-substituent is $-(CH_2)_2-COOH$.

In some embodiments of the invention, the peptoid comprises from about 6 to about 18 monomeric residues, and two or more (such as four or more) hydrophobic N-substituents grouped together, and two or more (such as four or more) hydrophilic N-substituents grouped together, wherein each hydrophilic N-substituent comprises a carboxylic acid.

Figure 4:
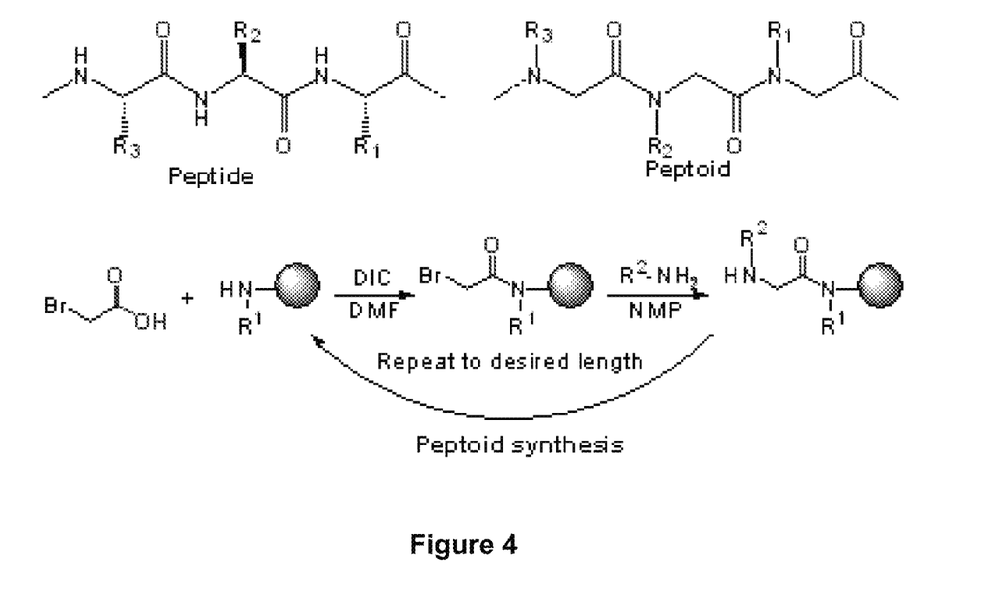
FIG. 4 shows a method for synthesizing a peptoid polymer.

The peptoid of the present invention can be synthesized using the following process: each residue is installed in two steps: acylation and displacement. In the acylation step a haloacetic acid, typically bromoacetic acid activated by diisopropylcarbodiimide reacts with the amine of the previous residue. In the displacement step (a classical $S_N2$ reaction), an amine displaces the halide to form the N-substituted glycine residue. See FIG. 4. The peptoids can be synthesized or produced using the methods taught in U.S. Provisional Patent Application Ser. Nos. 61/065,189, filed Feb. 8, 2008, and 61/086,773, filed Aug. 6, 2008; U.S. patent application Ser. No. 12/378,034, filed Feb. 9, 2009; and, PCT International Patent Application No. PCT/US2009/000840, filed Feb. 9, 2009; hereby incorporated by reference.

In some embodiments of the invention, the carbonate is $CaCO_3$.

The present invention provides for a method for sequestering carbon dioxide, comprising: (a) providing a bio-mimetic polymer capable of catalyzing $CO_2$ into a carbonate, and (b) contacting the bio-mimetic polymer with a carbon dioxide, such that the carbonate is formed.

The present invention provides for a sequence-specific bio-mimetic polymer (such as a peptoid) that is a catalyst capable of catalyzing and/or accelerating the mineralization of $CaCO_3$, and capture $CO_2$ in the form of $CaCO_3$ minerals. This $CO_2$ capture process can be performed under geological environmental conditions and the formed $CaCO_3$ minerals can be stored underground.

The present invention provides for peptoid polymers of specific sequence that accelerate the formation of calcium carbonate, and store the $CO_2$ in the form of calcium carbonate minerals. The peptoid polymers can accelerate the process by 20 to 40-fold, as compared to existing materials which can only achieve a 1.5-fold acceleration. Furthermore, the peptoid polymers are effective at very dilute concentrations (nanomolar) range. The peptoids are catalysts, and are re-usable.

In some embodiments of the invention, the $CaCO_3$ mineral formed is a $CaCO_3$ crystal. In some embodiments of the invention, the $CaCO_3$ crystal has a non-rhombohedral crystal structure. In some embodiments of the invention, the $CaCO_3$ crystal has an elongated spindle, twisted paddle, cross, or spherical crystal structure.

Peptoids are a novel class of non-natural polymers recently developed to mimic both structures and functionalities of peptides and proteins, and bridge the gap between biopolymers and bulk polymers. Sequence-specific peptoids can be efficiently synthesized by using automated solid-phase synthesis starting from a large number of chemically diverse amine building blocks. Moreover, peptoids exhibit much higher protease stability and thermal stability than peptides or proteins.

In nature, living organisms capture $CO_2$ through a biomineralization process to produce well-defined calcium carbonate minerals for routine functions (e.g. mechanical support, navigation), in which the proteins play significant roles in the control of mineral nucleation and growth. Some recent research that showed low concentrations of acidic peptides and proteins can significantly accelerate calcite growth. However, for the geological $CO_2$ sequestration aspect, using peptides or proteins is not a practical way because their instabilities in the geological environment. In this invention, we designed and synthesized a suite of peptoids and screened them for control over calcite morphology and growth rate. Our results demonstrated that peptoids exhibited a both high degree of morphological control and extreme levels of acceleration. For example, an octameric amphiphilic peptoid increased calcite growth rates by nearly 2300% at a concentration of only nM range. Such high acceleration rate under nM range will be very practical for industrial application of peptoids toward $CO_2$ sequestration.

The mechanisms of rate acceleration of carbonate mineralization are not well understood, making the design of new effective mineralization catalysts difficult. Known materials are predominantly polypeptide or polymeric in nature, but design rules for their improvement are not understood. We were able to identify these materials by a systematic exploration of an entirely new class of biomimetic polymer.

Table 1 shows examples of some reported proteins and peptides which increased calcite step growth rate (Elhad, S.; DeYoreo, J. J.; Hoyer, J. R.; Dove, P. M. *Proc. Natl. Acad. Sci.* 2006, 103, 19237-19242).

TABLE 1

| Increased positive step velocity at 100 nM | Molecular Weight g/mol | Protein/peptide |
| --- | --- | --- |
| 150% and 80% | 8700 and 7800 | AP8-α and AP8-β |
| 64% | 2777 | |
| 44% | 2957 | |
| 15% | 708 | |

The invention is useful in many industries, such as in the chemical industry, the petroleum industry, and/or the steel industries.

The invention having been described, the following examples are offered to illustrate the subject invention by way of illustration, not by way of limitation.

Example 1

General Approach for Peptoid Synthesis and Preparation

All peptoids are all synthesized on an automated robot synthesizer using a solid-phase submonomer cycle as described previously (Zuckermann, R. N.; Kerr, J. M.; Kent, S. B. H.; Moos, W. H. *J. Am. Chem. Soc.* 1992, 114, 10646-10647; hereby incorporated by reference), and are purified to more than 95% purity by reverse-phase HPLC. All amine submonomers and other reagents used for our peptoid synthesis are obtained from commercial sources and used without further purification. Stock solutions of all peptoids are prepared in water at 2.0 mM concentrations, and saturated $(NH_4)_2CO_3$ solutions are used to facilitate dissolution.

General Approach for Monitoring Peptoid Enhanced Calcite Growth

The dependence of molecular step speed on peptide concentration is measured by using in situ AFM to image growth on the (104) face of calcite in solutions at a fixed supersaturation, $\sigma$, such that $\sigma=0.14$. The supersaturation is defined as $\sigma=\ln(\alpha_{Ca}^{2+}\alpha_{CO3}^{2-}/K_{sp})$, where $\alpha$ denotes the species activity, and $K_{sp}$ denotes the equilibrium solubility constant at 25° C.

Natural calcite crystals are cleaved to produce fresh (104) faces as substrates for calcite growth. Calcite samples are used immediately upon cleaving after a brief cleaning with a nitrogen jet to remove any debris. Growth solutions are prepared immediately before use from reagent grade calcium chloride $(CaCl_2.H_2O)$, and sodium bicarbonate $(NaHCO_3)$ dissolved in deionized ($\geq 18$ M$\Omega$) and filtered water (0.2 µm).

During calcite growth, the steady-state morphology of atomic steps is imaged at constant supersaturation (for example, $\sigma=0.14$) for all peptoids at various concentrations. Using established methods, calcite is overgrown onto the surface of a calcite seed crystal in an AFM flow-through cell (50 µl) that continuously supplied the input solution at a rate greater than 30 ml/h via a syringe pump. These flow conditions insure that calcite growth is reaction and not transport limited as demonstrated in previous studies (Teng H H, Dove P M, DeYoreo J J (1999) Geochim Cosmochim Acta 63:2507-2512; hereby incorporated by reference). Measurements of step speeds are conducted at room temperature with a Digital Instruments Nanoscope III or V (Veeco, Santa Barbara, Calif.) operating in Contact Mode. The AFM images are collected by using scan rates of 5-20 Hz and a resolution of 512×512, while minimizing tip-surface force interactions during the flow-through of the growth solutions to minimize artifactual effects on step edge morphology and measured velocities (Teng H H, Dove P M, De Yoreo J J (2000) Geochim Cosmochim Acta 64:2255-2266; hereby incorporated by reference).

Example 2

Engineered Biomimetic Polymers as Tunable Agents for Controlling $CaCO_3$ Mineralization In nature, living organisms use peptides and proteins to precisely control the nucleation and growth of inorganic minerals and sequester $CO_2$ via mineralization of $CaCO_3$. Here, we report the exploitation of a novel class of sequence-specific non-natural polymers called peptoids as tunable agents that dramatically control $CaCO_3$ mineralization. We show that amphiphillic peptoids composed of hydrophobic and anionic monomers exhibit both a high degree of control over calcite growth morphology, as well as an unprecedented 23 fold acceleration of growth at peptoid concentration of only 50 nM, while acidic peptides of similar molecular weight only exhibited enhancement factors of ~2 or less. We further show controls on both morphology and rate are dependent on peptoid sequence, side chain chemistry, chain length and concentration. These findings provide guidelines for developing sequence-specific non-natural polymers that mimic the functions of natural peptides or proteins in their ability to direct mineralization of $CaCO_3$, with an eye towards their application to sequestration of $CO_2$ through mineral trapping.

$CO_2$ emission is one of the most important anthropogenic sources of global warming. Moreover, even the most optimistic estimates of energy production from renewable sources and nuclear power over the next century show that the burning of fossil fuels will continue to be the dominant source of world-wide energy production.[1] Consequently, research to develop new materials that can reduce atmospheric $CO_2$ concentrations by efficiently capturing it at the source has drawn intense interest[1-2] and has recently been directed towards synthesis of porous materials such as zeolites[3] and metal-organic framework compounds.[1,4] However, most scenarios for transforming captured $CO_2$ into a sequestered product rely primarily on storage in nano-to-meso-porous underground geologic reservoirs where, over time, dissolution of supercritical $CO_2$ into pore-space brines will lead to permanent trapping through precipitation of thermodynamically stable carbonate minerals.[5-6] Even during the period of time when most of the $CO_2$ remains in supercritical form, partial mineralization of pore throats, where curvature is greatest, can serve to immobilize supercritical $CO_2$ through capillary trapping. Conversely, premature mineralization near the injection zone can prevent adequate utilization of the reservoir. As a result chemical agents that can inhibit carbonate mineralization at certain stages of sequestration, but serve as catalysts to accelerate mineralization in other stages, have the potential to significantly improve the utility and integrity of underground reservoirs for $CO_2$ storage.[7]

In nature, many marine organisms use proteins to induce mineralization of carbonates from aqueous precursors[7-9] on such a vast scale that they impact global seawater chemistry.[10] In doing so, over time, these organisms have produced a sedimentary record that represents the single largest terrestrial reservoir of $CO_2$. While organisms use the process of biomineralization to produce well-defined carbonate minerals—both crystalline and amorphous—for routine functions such as mechanical support and protection, in vitro experiments have demonstrated that some proteins found in association with $CaCO_3$ biominerals, as well as shorter chain peptides with sequences similar to those found in the proteins, can promote or inhibit $CaCO_3$ nucleation and growth absent any biological context.[11] These findings suggest that synthetic molecules might be discovered that can provide similar controls over man-made crystallization processes. Moreover, design of molecules that mimic the action of these natural biopolymers, but are much more stable against high pressures, temperatures and acidic conditions might result in a technology that is broadly applicable to industrial crystallization, including $CO_2$ sequestration.

Here we report that peptoids, a novel class of sequence-specific non-natural biomimetic polymers, can be designed and synthesized to mimic peptides and proteins for mineralization of $CaCO_3$. We identified a set of amphiphilic peptides that dramatically alter calcite growth morphology and accelerate mineralization rates by more than an order of magnitude, even at very low (nM) concentrations.

Peptoids, or poly-N-substituted glycines, were recently developed to mimic both the structure and functionality of peptides and proteins, and bridge the gap between biopolymers and bulk polymers.[12-14] As with peptides, sequence-specific peptoids can be efficiently and cheaply synthesized by using automated solid-phase synthesis starting from a large number of chemically diverse amine building blocks.[15] Moreover, peptoids exhibit much higher protease stability[16] and structural stability[17] than peptides or proteins. Recognizing the ability of peptides and natural proteins to enhance carbonate mineralization, the interesting structural features and properties of peptoids prompted us to tackle the challenge of developing high performance synthetic alternatives.

Numerous discoveries within the field of biomimetic mineralization of $CaCO_3$ indicate that the specific amino-acid sequence, the number of carboxylic acid groups (or the number of glutamic or aspartic acids), and the overall hydrophilicity of the proteins or peptides play important roles in the control of nucleation and growth of calcium carbonate minerals.[11,18-20] Therefore, we began first to design and synthesize peptoids using a minimalist monomer set consisting of a hydrophobic monomer N-[2-(X-phenylethyl)]glycine (NXpe) (X=4-H, 4-Cl, 4-OMe, or 2,4-dichloro), and a hydrophilic monomer N-(2-carboxyethyl)glycine (Nce). A small library of peptoids was made by varying the X groups, the number of carboxylic acid residues, the position of the hydrophobic monomers, and the main-chain length (12 or 16 monomers). All peptoids were synthesized on an automated robotic synthesizer using a solid-phase submonomer cycle as described previously.[15]

Figure 5:
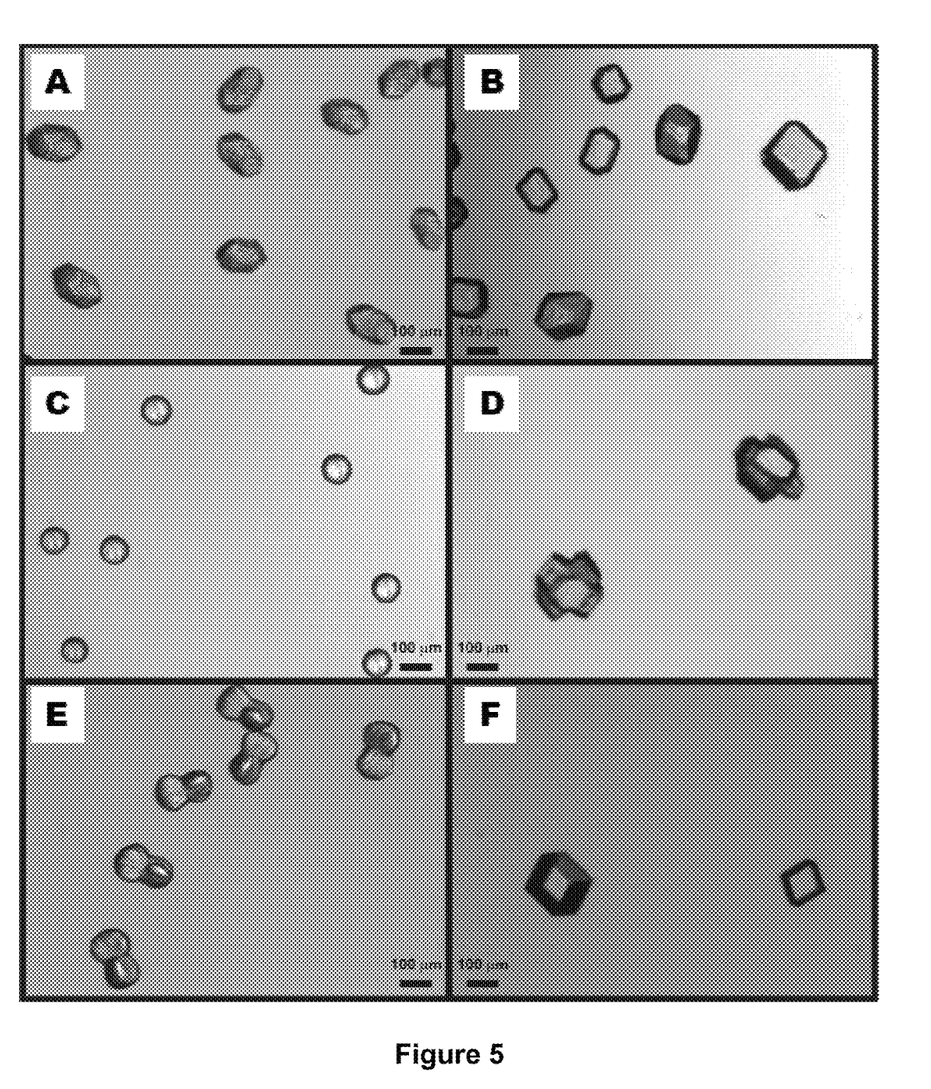
FIG. 5 shows the $CaCO_3$ crystals morphology in the presence of (A) peptoid-3, (B) peptoid-1, (C) peptoid-4, (D) peptoid-6, (E) peptoid-10 and (F) control.
Figure 6:
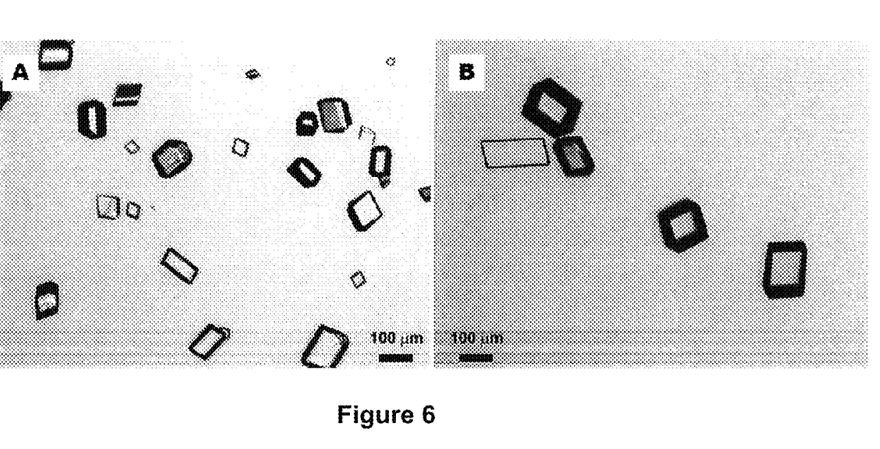
FIG. 6 shows $CaCO_3$ crystals morphology in the presence of peptoids: (A) peptoid-2, and (B) peptoid-5.

To demonstrate the ability of these designed peptoids to direct $CaCO_3$ mineralization, we first studied their effect on $CaCO_3$ growth morphology. We reasoned that any peptoid that could strongly affect $CaCO_3$ nucleation and growth should certainly alter $CaCO_3$ morphology when grown at high peptoid concentration. $CaCO_3$ mineralization was performed within a sealed desiccator by slow diffusion of $CO_2$ and ammonia vapor into a solution containing calcium chloride and peptoid.[21] We found that the morphological features of $CaCO_3$ crystals grown in the presence of some peptoids at 50 μM concentrations were very similar to those observed in crystals grown from solutions containing natural acidic proteins associated with biominerals.[22] As shown in FIG. 5, the obtained $CaCO_3$ crystals exhibited a number of unique morphologies ranging from elongated spindles and twisted paddles to crosses and spheres. This high degree of morphological control demonstrates that peptoids are capable of strongly interacting with the $CaCO_3$ surface and affecting nucleation and growth. Interestingly, peptoid-5 which is composed of closely related NXpe (X=H) and Nce monomers exhibited almost no effect on crystal morphology. The $CaCO_3$ crystals grown in the presence of peptoid-5 at 50 μM are very similar to the rhombohedral calcite crystals grown in the peptoid-free control solution (FIG. 6).

Further comparison of peptoid-induced controls over calcite morphology shows that the choice of the X group of the hydrophobic monomer has a significant effect. For example, although peptoids 1-4 have very similar structures, they exhibited distinct effects on crystal morphology. Each of these sequences contains four NXpe at the N-terminus and eight Nce on C-terminus. Peptoid-4 (X=2,4-dichloro) gave twined spheroidal shapes (FIG. 3), peptoid-3 (X=4-chloro) caused the formation of elongated spindles (FIG. 3), and crystals grown in the presence of peptoid-2 (X=4-H) and peptoid-1 (X=4-OMe) produced truncated rhombohedra (FIG. 5C and FIG. 6). These results indicate that variation of X groups is sufficient to tune the peptoid-$CaCO_3$ interactions and thus affect $CaCO_3$ nucleation and growth.

We also examined the impact of the number of carboxylic acid groups on crystal morphology. While elongated spindles were obtained in the presence of peptoid-3 (FIG. 3), peptoid-10, which has four more Nce residues at the C-terminus than does peptoid-3, induced formation of "twisted paddles" (FIG. 5B). Interestingly, when we moved the group of four hydrophobic monomers NXpe (X=4-chloro) to the middle position to make peptoid-6, the result was formation of cross-shaped crystals. These results demonstrate that both the number of carboxylic acid groups and the peptoid sequence can also be used to tune the peptoid-crystal interactions.

To determine whether these peptoids also had significant effects on calcite growth kinetics as was observed previously for acidic peptides and proteins,[22-24] we measured the dependence of molecular step speed on peptoid concentration using in situ atomic force microscopy (AFM). At low to moderate supersaturations, calcite crystals grow on (104) faces through the advance of atomic steps of two crystallographically distinct types (FIG. 1), commonly referred to as obtuse and acute due to the angle formed by the crystal face and the nominal plane of the step riser. In situ AFM measurement of step speed is a well-established method for probing the molecular-scale effects of modifiers on crystal growth kinetics.[25-26]

Figure 2:
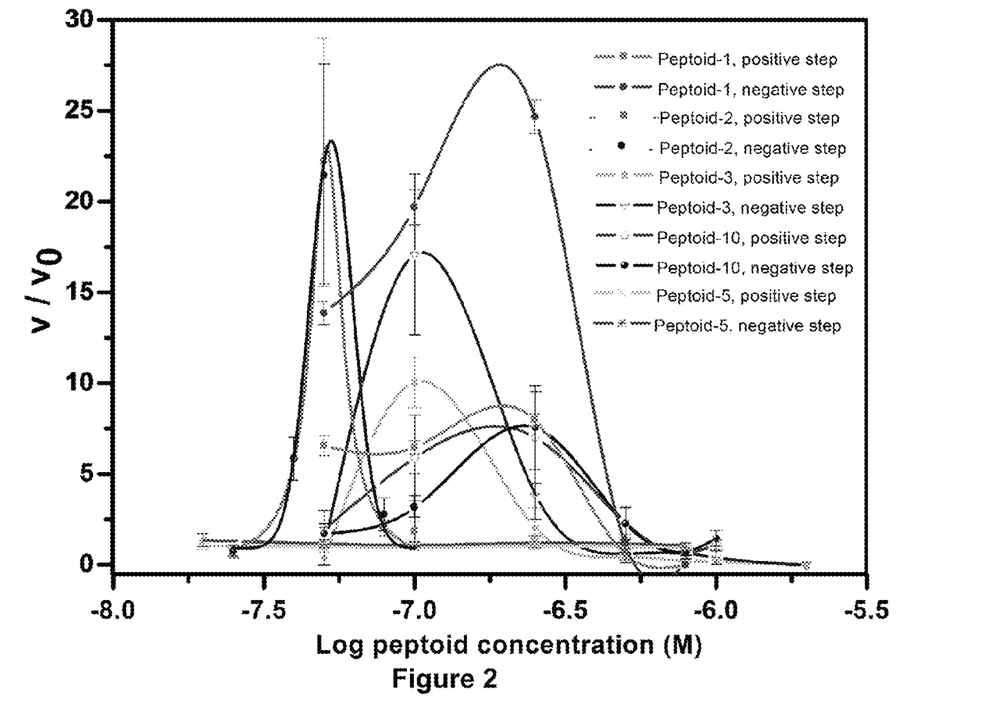
FIG. 2 shows the experimental measurements of calcite step velocity versus peptoid concentration, in which v is step velocity with peptoid, and $v_0$ is the step velocity without peptoid. Some peptoids increased calcite step growth rate by more than 2200% at very dilute concentrations (nanomolar) range.
Figure 3A:
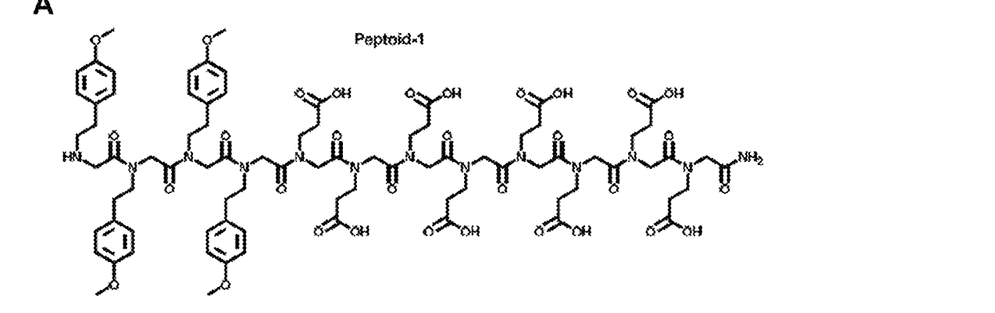
FIG. 3 shows the chemical structures of (A) peptoid-1, (B) peptoid-2, (C) peptoid-3, (D) peptoid-4, (E) peptoid-5, (F) peptoid-6, (G) peptoid-10, and (H) peptoids 1-3, wherein X=H for peptoid-2, X=Cl for peptoid-3, and X=OMe for peptoid-1. Their molecular weights range from 1695 to 2349 g/mol.
Figure 3B:
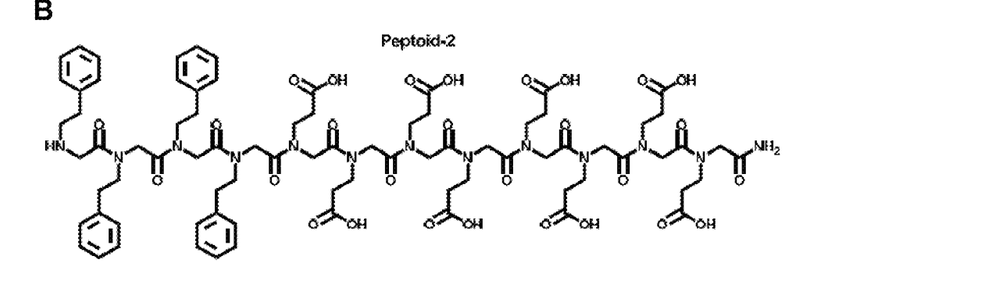
Figure 3C:
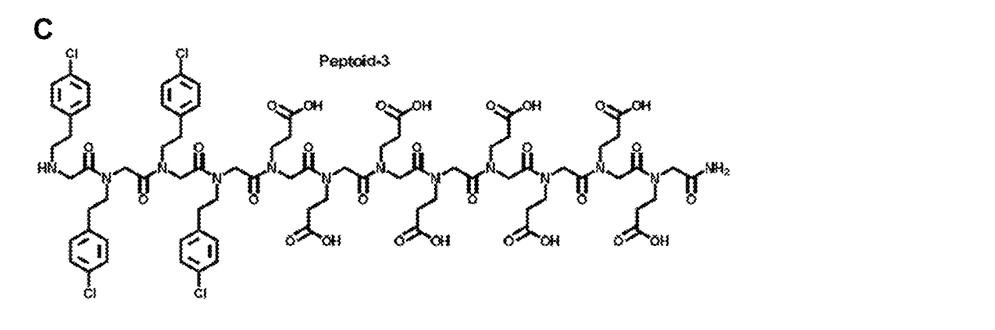
Figure 3D:
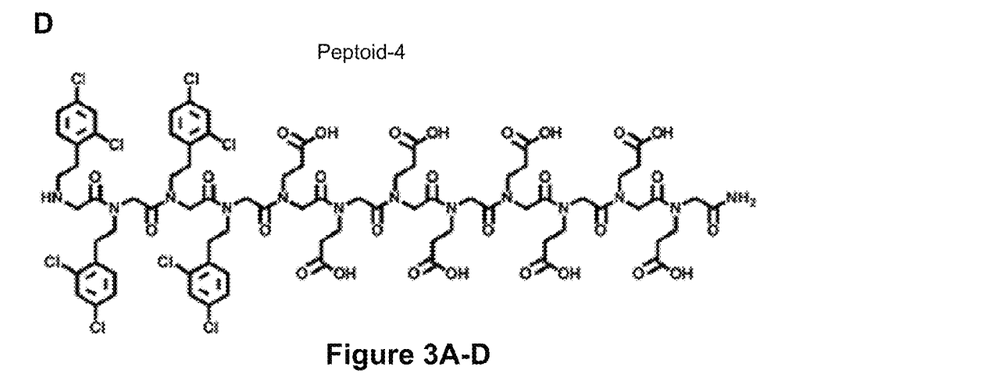
Figure 3E:
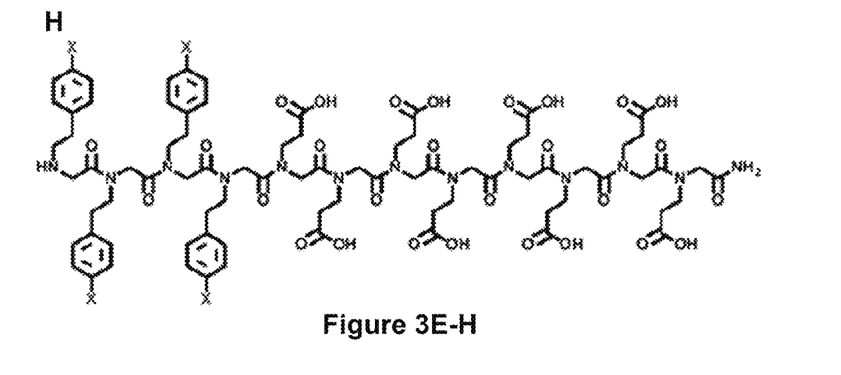

FIG. 2 shows the measured enhancement of step speed vs peptoid concentration at a supersaturation of 0.14. These figures show that, in addition to altering calcite growth morphology, some peptoids dramatically impacted the step speeds at low concentrations (≤200 nM). For example, peptoid-2 accelerated both obtuse and acute step speeds by nearly 23-fold at a concentration of only 50 nM. Peptoid-1 accelerated speed of the acute step much more than that of the obtuse step, giving accelerations of nearly 28-fold and 8-fold, respectively, at around 200 nM. These extreme values of acceleration stand in stark contrast, to those previously reported for acidic peptides of similar molecular weight, which exhibited enhancement factors of 1.64 or less (Table 2).[23] As was previously observed with acidic peptides, as the peptoid concentration was increased beyond the point of maximum acceleration, the effect reversed and the step speed rapidly decreased, which is likely due to binding of peptoids to the calcite step.[27]

Interestingly, we further found that addition of peptoid-5, which exhibited almost no effect on $CaCO_3$ morphology at 50 μM (FIG. 6A), showed almost no changes in either the obtuse or acute step speeds from 20 nM to 800 nM, despite the fact that peptoid-5 and peptoid-2 both have 12-monomers and the same NXpe (X=4-H) and Nce building blocks. These large differences show that peptoid block sequence patterning plays an important role in determining the effect on calcite growth kinetics.

The observations presented here combined with previous experimental and computational results suggest three possible sources of growth acceleration. The first is that peptoids effectively raise the local supersaturation. All of these peptoids are rich in carboxylic acid groups, and thus could act as a Ca(II) transporters, which could affect the available Ca(II) concentration near the crystal surface. This mechanism of enhancement was predicted for barite growth in the presence of aspartic acid based on molecular dynamics simulations.[20,23,28] However, an examination of the dependence of step speed on $Ca^{2+}$ concentration renders this an unlikely explanation. The step speed is given by: $V=\beta_0(C-C_e)\exp(-E/kT)$ (1), where $C$ and $C_e$ are the actual and equilibrium concentrations, E is the activation barrier to desolvation and attachment at the step, and $\beta_0$ is a concentration independent parameter that includes a number of factors. However, because the step speed is linear in $(C-C_e)$, for this mechanism to explain the >10-fold enhancements seen here, peptoids would have to increase the local concentration by an equivalent factor.

An order of magnitude estimate illustrates the difficulty in achieving this increase. For the $Ca^{2+}$ concentrations used in this study, the number density of $Ca^{2+}$ ions is about $1.0\times10^{-4}$ per $nm^3$. A 10-fold increase in $Ca^{2+}$ concentration requires additional $9.0\times10^{-4}$ $Ca^{2+}$ ions per $nm^3$. For the most potent peptoid, there are eight carboxylic side chains. If every side chain weakly complexes a $Ca^{2+}$ ion, one would require a peptoid concentration of 0.20 mM ($1.2\times10^{-4}$ peptoids per $nm^3$) near the crystal surface to get this increase in $Ca^{2+}$ concentration. Given that the bulk peptoid concentration is only 50 nM, achieving a ten-fold increase in $Ca^{2+}$ levels would then require a $4.0\times10^3$ enhancement in the peptoid concentration, which seems unlikely. Nonetheless, this estimate shows that a high affinity of the peptoids for the surface could have a moderate impact on near-surface concentrations.

The second potential mechanism for the observed acceleration is that peptoid interactions with solvated ions lower the activation barrier to desolvation and/or orientation of the solute ions prior to attachment to the crystal. This mechanism was proposed by Elhadj et al.,[23] who used analysis of Equation (1) to show that E was reduced in the presence of carboxyl-rich peptides. As with the peptides of that investigation, all of the peptoids studied here have large numbers of carboxyl groups. These should lead to strong interactions with solvated cations in solution such as $Ca^{2+}$ and thereby weaken the bonds of $Ca^{2+}$ hydration.[29] Because the value of E in the pure system is 34 kJ/mol,[30] to produce a 10-fold enhancement through a reduction of the barrier would require a drop in E of less than 6 kJ/mol. However, as discussed above, the degree of acceleration is much larger for the peptoids, despite the fact that they are of comparable size to the most effective of the peptides.[23] Consequently, applying this explanation to peptoids is problematic.

The third potential mechanism is that the activation barrier to solute attachment to the crystal is lowered through disruption of the water layer adsorbed to the crystal surface. A number of simulations have predicted that displacing these surface-bound waters from the crystal is the most energetically costly step in adsorptions of solute ions to the crystal surface.[31-32] All of these peptoids are amphiphiles, containing a polar block of multiple carboxylic acid residues and a hydrophobic block of multiple aromatic residues. The carboxyl-rich block is structurally similar to previously studied peptides, which are known to bind to the calcite surface. The polar block may serve to recruit the hydrophobic block to the proximity of the surface, which may then assist in the disruption of the surface-adsorbed waters. The hydrophobic block may also serve to modulate the overall peptoid affinity to the surface. Because these peptoids are active over a relatively narrow range of peptoid concentration, it is very likely that reversible binding to the calcite surface is important. The magnitude of the binding energy per water molecule is ~90 kJ/mol,[31-32] thus the 6 kJ/mol drop in E required to obtain a 10× enhancement requires a relatively small reduction in the binding energy.

In conclusion, anionic and amphiphilic peptoids exhibited both a high degree of control over calcite growth morphology and extreme levels of growth acceleration. Both morphology and rate controls were observed to be dependent on peptoid sequence, side chain chemistry, chain length and concentration. Because large peptoid libraries can be built from a broad set of chemically diverse amine building blocks, we expect more effective peptoids will be discovered in the near future. Because subtle changes in peptoid structure are seen to generate large changes in the degree of control over growth, this approach also has the potential to offers new insights into how biopolymers precisely control mineral growth in natural systems. Moreover, due to their high protease resistance[16] and structural stability,[17] as well as their ability to greatly accelerate $CaCO_3$ mineralization rates at very dilute concentrations, peptoids may be useful in $CO_2$ sequestration by enhancing rates of mineral trapping and the extent of capillary trapping in geologic reservoirs.

Methods and Materials

Peptoid Synthesis.

All peptoids were synthesized on a commercial Aapptec Apex 396 robotic synthesizer on using a solid-phase submonomer cycle as described previously.[15] All amine submonomers and other reagents used for our peptoid synthesis are obtained from commercial sources and used without further purification. Rink amide resin (0.60 mmol/g, Novabiochem, Cat No. 01-64-0013) was used to generate C-terminal amide peptoids. In this method, the Fmoc group on the resin was deprotected by adding 2 mL of 20% (v/v) piperidine/N, N-dimethylformamide (DMF), agitating for 20 min, draining, and washing with DMF. All DMF washes consisted of the addition of 1 mL of DMF, followed by agitation for 1 min (repeated five times). An acylation reaction was then performed on the amino resin by the addition of 1.0 mL of 1.2 M bromoacetic acid in DMF, followed by 0.18 mL of N,N-diisopropylcarbodiimide (DIC, 1.15 mmol, neat). The mixture was agitated for 20 min at room temperature, drained, and washed with DMF. Nucleophilic displacement of the bromide with various primary amines occurred by a 1.0 mL addition of the primary amine monomer as a 1.0-1.5 M solution in N-methyl-2-pyrrolidone (NMP), followed by agitation for 60 min at room temperature. The monomer solution was drained from the resin, and the resin was washed with DMF as described above. The acylation and displacement steps were repeated until a polypeptoid of the desired length was synthesized. All reactions were performed at room temperature. All polypeptoids were acetylated on the resin after synthesis using a mixture (2.0 mL per 100 mg of resin) of 0.4 M acetic anhydride and 0.4 M pyridine in DMF for 30 min, followed by washing with DMF. Peptoid chains were cleaved from the resin by addition of 4.0 mL 95% (v/v) trifluoroacetic acid (TFA) in water for 20 min, which was then evaporated off under a stream of nitrogen gas. Following cleavage, peptoids were dissolved in 4.0 mL mixture (v/v=1:1) of water and acetonitrile for further purification. All peptoids were purified by reverse-phase HPLC on a Vydac C4 column (10 μm, 22 mm×250 mm), using a gradient of 5-95% acetonitrile in $H_2O$ with 0.5% TFA over 60 min. All final products were analyzed by analytical reverse-phase HPLC (5-95% gradient at 1 mL/min over 30 minutes at 60° C. with a C4, 5 μm, 4.6×150 mm column), and electrospray mass spectrometry (Agilent 1100 series LC/MSD trap system, Agilent Technologies, Santa Clara, Calif.) or matrix assisted laser desorption/ionization mass spectrometry (Applied Biosytem/MDS SCIEX 4800 MALDI TOF/TOF Analyzer). The final peptoid products were lyophilized at least twice from their solution in mixture (v/v=1:1) of water and acetonitrile. All lyophilized peptoids were finally divided into small portions (3.0×10-6 mol) and stored at −80° C.

Peptoid Sequences.

Structures of the synthesized peptoids and molecular weight of each peptoid as determined by mass spectrometry are show below. The following monomer abbreviations were used to name the sequences: Nce: N-(2-carboxyethyl)glycine; NXpe: N-[2-(X-phenethyl)]glycine.

(NXpe)$_4$(Nce)$_8$ (X = 4-H) Molecular weight: 1694.7 (Calculated), 1694.4 (Found)

(NXpe)$_4$(Nce)$_8$ (X = 4-Cl) Molecular weight: 1832.5 (Calculated), 1831.6 (Found)

(NXpe)$_4$(Nce)$_8$ (X = 4-OMe) Molecular weight: 1814.8 (Calculated), 1813.5 (Found)

(NXpe)₄(Nce)₈ (X = 2,4-Dichloro) Molecular weight: 1970.3 (Calculated), 1969.0 (Found)

(Nce)₄(NXpe)₄(Nce₄) (X = 4-Cl) Molecular weight: 1832.5 (Calculated), 1832.5 (Found)

(NceNXpe)₆ (X = 4-H) Molecular weight: 1758.9 (Calculated), 1757.9 (Found)

(NXpe)$_4$(Nce)$_{12}$ (X = 4-Cl) Molecular weight: 2349.0 (Calculated), 2348.2 (Found)

Preparation of Peptoid Stock Solution.

Lyophilized peptoids (3.0×10$^{-6}$ mol) were mixed with 1.5 mL in deionized (≥18 MΩ) and filtered water (0.2 μm) water in glass vial, and 10 μl saturated (NH$_4$)$_2$CO$_3$ solutions were used to facilitate dissolution.

Crystal Growth Experiments.

Crystallization of CaCO$_3$ was performed by slow diffusion of (NH$_4$)$_2$CO$_3$ vapor into 96-well plates in which each well has 190 μL of 5.0 mM CaCl$_2$ solution and 5.0 μL of 2.0 mM peptoid stock solution (final peptoid concentration=51.3 μM). For control experiments similar volumes of water were added. The 96-well plate was placed in a closed desiccator cabinet. All crystallization experiments were repeated three to five times. Crystals morphology were studied by optical microscopy (OLYMPUS, CKX41)

In Situ AFM Study of the Calcite Step Growth.

Figure 1:
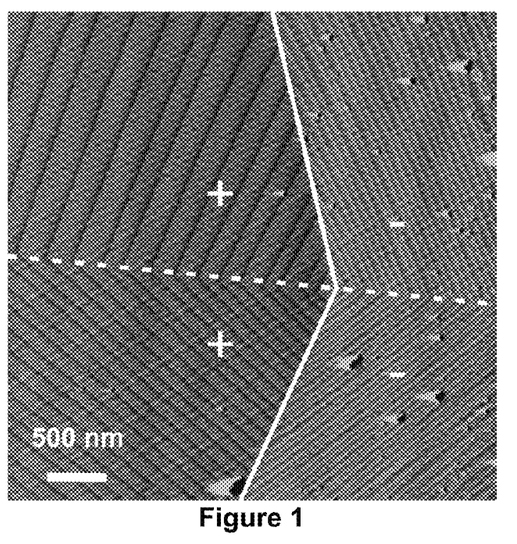
FIG. 1 shows the representative in-situ AFM image to show the positive and negative steps on calcite (104) surface.

The dependence of molecular step speed on peptide concentration was measured by using in situ AFM to image growth on the (104) face of calcite in solutions at a fixed supersaturation, σ, of 0.14. The supersaturation is defined as $\sigma=\ln(\alpha_{Ca}^{2+}\alpha_{CO3}^{2-}/K_{sp})$, where α denotes the species activity, and $K_{sp}$ denotes the equilibrium solubility constant at 25° C. This supersaturated (σ=0.14) calcium carbonate solution was made by directing mixing 10.5 mM NaHCO$_3$ with 0.34 mM CaCl$_2$ at equal volumes. Natural calcite crystals were cleaved to produce fresh (104) faces as substrates for calcite growth. Calcite samples were used immediately upon cleaving after a brief cleaning with a nitrogen jet to remove any debris. Growth solutions were prepared immediately before use from reagent grade calcium chloride (CaCl$_2$.H2O), and sodium bicarbonate (NaHCO$_3$) dissolved in deionized (≥18 MΩ) and filtered water (0.2 μm). During calcite growth, the steady-state morphology of atomic steps was imaged at constant supersaturation (σ=0.14) for all peptoids at various concentrations. Using established methods, calcite was overgrown onto the surface of a calcite seed crystal in an AFM flow-through cell (50 μL) that continuously supplied the input solution at a rate greater than 30 mL/h via a syringe pump. These flow conditions insured that calcite growth was reaction and not transport limited as demonstrated in previous studies (Teng, H. H.; Dove, P. M.; DeYoreo, J. J. *Geochim. Cosmochim. Acta* 1999, 63, 2507; hereby incorporated by reference). Measurements of step speeds were conducted at room temperature with a Digital Instruments Nanoscope III or V (Veeco, Santa Barbara, Calif.) operating in Contact Mode. The AFM images were collected by using scan rates of 5-20 Hz and a resolution of 512×512, while minimizing tip-surface force interactions during the flow-through of the growth solutions to minimize artifactual effects on step edge morphology and measured velocities (Teng, H. H.; Dove, P. M.; De Yoreo, J. J. *Geochim. Cosmochim. Acta* 2000, 64, 2255; hereby incorporated by reference). FIG. 1 is a representative in situ AFM image to show the positive and negative steps on calcite (104) surface.

TABLE 2

Experimental measurements of step acceleration ($v/v_0$) at low peptoid or peptide concentration under different supersaturated ($\sigma$ = 0.14 or 0.92) calcium carbonate solution. The bottom three measurements are taken from ref. 23.

| Peptoid or Peptide | Molecular weight, g/mol | Step acceleration ($v/v_0$) |
|---|---|---|
| Peptoid-2 | 1695 | $v_+/v_0$: 22.25 at 50 nM; $\sigma$ = 0.14 |
| | | $v_-/v_0$: 21.48 at 50 nM; $\sigma$ = 0.14 |
| Asp$_6$ | 708 | $v_+/v_0$: 0.84 at 50 nM; $\sigma$ = 0.14 |
| | | $v_-/v_0$: 0.88 at 50 nM; $\sigma$ = 0.14 |
| Asp$_6$ | 708 | $v_+/v_0$: 1.15 at 100 nM; $\sigma$ = 0.92 |
| (Asp$_3$Ser)$_6$Asp$_3$ | 2957 | $v_+/v_0$: 1.44 at 100 nM; $\sigma$ = 0.92 |
| (Asp$_3$Gly)$_6$Asp$_3$ | 2777 | $v_+/v_0$: 1.64 at 100 nM; $\sigma$ = 0.92 |

REFERENCES CITED (1) D'Alessandro, D. M.; Smit, B.; Long, J. R. *Angew. Chem., Int. Ed.* 2010, 49, 6058.
(2) Yu, K. M. K.; Curcic, I.; Gabriel, J.; Tsang, S. C. E. *ChemSusChem* 2008, 1, 893.
(3) Choi, S.; Drese, J. H.; Jones, C. W. *ChemSusChem* 2009, 2, 796.
(4) Phan, A.; Doonan, C. J.; Uribe-Romo, F. J.; Knobler, C. B.; O'Keeffe, M.; Yaghi, O. M. *Acc. Chem. Res.* 2010, 43, 58.
(5) Haszeldine, R. S. *Science* 2009, 325, 1647.
(6) Orr, F. M. *Science* 2009, 325, 1656.
(7) Lee, S. W.; Park, S. B.; Jeong, S. K.; Lim, K. S.; Lee, S. H.; Trachtenberg, M. C. *Micron* 2010, 41, 273.
(8) Meldrum, F. C. *Int. Mater. Rev.* 2003, 48, 187.
(9) Cusack, M.; Freer, A. *Chem. Rev.* 2008, 108, 4433.
(10) Stanley, S. M. *Chem. Rev.* 2008, 108, 4483.
(11) Sommerdijk, N.; de With, G. *Chem. Rev.* 2008, 108, 4499.
(12) Lee, B. C.; Chu, T. K.; Dill, K. A.; Zuckermann, R. N. *J. Am. Chem. Soc.* 2008, 130, 8847.
(13) Lee, B. C.; Zuckermann, R. N.; Dill, K. A. *J. Am. Chem. Soc.* 2005, 127, 10999.
(14) Nam, K. T.; Shelby, S. A.; Choi, P. H.; Marciel, A. B.; Chen, R.; Tan, L.; Chu, T. K.; Mesch, R. A.; Lee, B. C.; Connolly, M. D.; Kisielowski, C.; Zuckermann, R. N. *Nat. Mater.* 2010, 9, 454.
(15) Zuckermann, R. N.; Kerr, J. M.; Kent, S. B. H.; Moos, W. H. *J. Am. Chem. Soc.* 1992, 114, 10646.
(16) Miller, S. M.; Simon, R. J.; Ng, S.; Zuckermann, R. N.; Kerr, J. M.; Moos, W. H. *Drug Dev. Res.* 1995, 35, 20.
(17) Sanborn, T. J.; Wu, C. W.; Zuckermann, R. N.; Barron, A. E. *Biopolymers* 2002, 63, 12.
(18) Jones, F.; Ogden, M. I. *CrystEngComm* 2010, 12, 1016.
(19) Xu, A. W.; Ma, Y. R.; Colfen, H. *J. Mater. Chem.* 2007, 17, 415.
(20) Kim, I. W.; Darragh, M. R.; Orme, C.; Evans, J. S. *Cryst. Growth Des.* 2006, 6, 5.
(21) Addadi, L.; Weiner, S. *Proc. Natl. Acad. Sci. U.S.A.* 1985, 82, 4110.
(22) Fu, G.; Qiu, S. R.; Orme, C. A.; Morse, D. E.; De Yoreo, J. J. *Adv. Mater.* 2005, 17, 2678.
(23) Elhadj, S.; De Yoreo, J. J.; Hoyer, J. R.; Dove, P. M. *Proc. Natl. Acad. Sci. U.S.A.* 2006, 103, 19237. Note that, in the referenced study, measurements were performed at a supersaturation of 0.92, which represents an excursion from equilibrium that is unexpected in geologic reservoirs and greater than crystal growth conditions often used in industrial settings. At the much lower supersaturation of 0.14 used in the current study, peptide (Asp)$_6$ that showed moderate accelerations at 0.92 exhibited a slight inhibition at 0.14, as shown in Table 6.
(24) De Yoreo, J. J.; Wierzbicki, A.; Dove, P. M. *CrystEngComm* 2007, 9, 1144.
(25) Orme, C. A.; Noy, A.; Wierzbicki, A.; McBride, M. T.; Grantham, M.; Teng, H. H.; Dove, P. M.; DeYoreo, J. J. *Nature* 2001, 411, 775.
(26) Teng, H. H.; Dove, P. M.; Orme, C. A.; De Yoreo, J. J. *Science* 1998, 282, 724.
(27) Elhadj, S.; Salter, E. A.; Wierzbicki, A.; De Yoreo, J. J.; Han, N.; Dove, P. M. *Cryst. Growth Des.* 2006, 6, 197.
(28) Piana, S.; Jones, F.; Gale, J. D. *CrystEngComm* 2007, 9, 1187.
(29) Hamm, L. M.; Wallace, A. F.; Dove, P. M. *J. Phys. Chem. B* 2010, 114, 10488.
(30) Wasylenki, L. E.; Dove, P. M.; De Yoreo, J. J. *Geochim. Cosmochim. Acta* 2005, 69, 4227.
(31) Kerisit, S.; Parker, S. C.; Harding, J. H. *J. Phys. Chem. B* 2003, 107, 7676.
(32) Lardge, J. S.; Duffy, D. M.; Gillan, M. J. *J. Phys. Chem. C* 2009, 113, 7207.

The above cited references are hereby incorporated by reference.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A bio-mimetic polymer capable of catalyzing $CO_2$ into a carbonate, wherein the bio-mimetic polymer is an amphiphilic peptoid, wherein each monomeric residue of the peptoid comprises a hydrophobic or hydrophilic N-substituent, wherein the hydrophobic N-substituent is —$(CH_2)_2$—$C_6H_5$, —$(CH_2)_2$—$C_6H_4$—X, or —$(CH_2)_2$—$C_6H_4$—O—$CH_3$, wherein X is F, Br, Cl, or I; wherein the benzene is para-, ortho- or meta-disubstituted, and the hydrophilic N-substituent comprises a carboxylic acid, sulfate, sulfonate, phosphate, or phosphonate group, wherein the peptoid comprises two or more hydrophobic N-substituents which are grouped together on consecutive monomeric residues, and wherein the peptoid comprises two or more hydrophilic N-substituents which are grouped together on consecutive monomeric residues.

2. The bio-mimetic polymer of claim 1, wherein the peptoid is peptoid-1, peptoid-2, peptoid-3, or peptoid-10.

3. The bio-mimetic polymer of claim 1, wherein the peptoid has a molecular weight from about 1600 g/mol to about 2400 g/mol.

4. The bio-mimetic polymer of claim 3, wherein the peptoid has a molecular weight from about 1690 g/mol to about 2350 g/mol.

5. The bio-mimetic polymer of claim 1, wherein the bio-mimetic polymer is capable of accelerating the process of formation of carbonate from $CO_2$ equal to or more than tenfold, when compared to the formation of carbonate from $CO_2$ in the absence of the bio-mimetic polymer.

6. The bio-mimetic polymer of claim 5, wherein the bio-mimetic polymer is capable of accelerating the process of formation of carbonate from $CO_2$ equal to or more than 20-fold, when compared to the formation of carbonate from $CO_2$ in the absence of the bio-mimetic polymer.

7. The bio-mimetic polymer of claim 6, wherein the bio-mimetic polymer is capable of accelerating the process of formation of carbonate from $CO_2$ equal to or more than 40-fold, when compared to the formation of carbonate from $CO_2$ in the absence of the bio-mimetic polymer.

8. The bio-mimetic polymer of claim 1, wherein the peptoid comprises from 4 to 100 monomeric residues.

9. The bio-mimetic polymer of claim 1, wherein the peptoid comprises from 4 to 20 monomeric residues.

10. The bio-mimetic polymer of claim 9, wherein the peptoid comprises from 6 to 20 monomeric residues.

11. The bio-mimetic polymer of claim 10, wherein the peptoid comprises from 6 to 18 monomeric residues.

12. The bio-mimetic polymer of claim 11, wherein the peptoid comprises from 12 to 16 monomeric residues.

13. The bio-mimetic polymer of claim 1, wherein the hydrophilic N-substituent comprises a $-(CH_2)_2-COOH$.

14. A method for sequestering carbon dioxide, comprising:
   (a) providing the bio-mimetic polymer of claim 1, and
   (b) contacting the bio-mimetic polymer with a carbon dioxide, such that a carbonate is formed.

15. The method of claim 14, the carbonate is $CaCO_3$.

* * * * *